US012589582B2

(12) United States Patent
Matsuoka et al.

(10) Patent No.: US 12,589,582 B2
(45) Date of Patent: Mar. 31, 2026

(54) ROLLER, FILM ADHERING APPARATUS AND FILM ADHERING METHOD

(71) Applicant: 3M INNOVATIVE PROPERTIES COMPANY, St. Paul, MN (US)

(72) Inventors: Hiroyuki Matsuoka, Yokohama (JP); Takayoshi Fujino, Sagamihara (JP); Yasuyuki Daigo, Machida (JP); Masayuki Kubota, Hadano (JP)

(73) Assignee: 3M Innovative Properties Company, St. Paul, MN (US)

( * ) Notice: Subject to any disclaimer, the term of this patent is extended or adjusted under 35 U.S.C. 154(b) by 211 days.

(21) Appl. No.: 18/551,900

(22) PCT Filed: Mar. 21, 2022

(86) PCT No.: PCT/IB2022/052558
§ 371 (c)(1),
(2) Date: Sep. 22, 2023

(87) PCT Pub. No.: WO2022/200996
PCT Pub. Date: Sep. 29, 2022

(65) Prior Publication Data
US 2024/0165938 A1      May 23, 2024

(30) Foreign Application Priority Data

Mar. 22, 2021      (JP) ................................. 2021-047242

(51) Int. Cl.
B32B 37/00          (2006.01)
B29C 63/02          (2006.01)
B32B 37/10          (2006.01)
(52) U.S. Cl.
CPC .......... B32B 37/0053 (2013.01); B32B 37/10 (2013.01); B29C 63/02 (2013.01);
(Continued)

(58) Field of Classification Search
CPC . Y10T 156/18; Y10T 156/1788; B44C 1/165; B44C 1/17; B32B 37/0053;
(Continued)

(56) References Cited

U.S. PATENT DOCUMENTS 5,997,670 A      12/1999  Walter et al.
7,459,051 B2    12/2008  Habisreitinger et al.
(Continued)

FOREIGN PATENT DOCUMENTS

CN           111136905 B      11/2021
DE     102009009690 A1 *  9/2010   ......... B29C 63/0004
(Continued)

OTHER PUBLICATIONS

International Search Report received for PCT International Application No. PCT/IB2022/052558, mailed on Jun. 16, 2022, 2 pages.

*Primary Examiner* — Carson Gross
(74) *Attorney, Agent, or Firm* — Carlos M. Téllez Rodríguez; 3M Innovative Properties Co

(57)          ABSTRACT

A roller including a core portion having a cylindrical shape, a support portion located on a central axis of the core portion and configured to rotatably support the core portion, a foam body covering an entire circumference of the core portion and including an outer circumferential surface being flat, an operation portion configured to operate the foam body, and a fixing portion configured to fix the support portion and the operation portion, wherein at least one of end portions of the outer circumferential surface bends toward a direction of the central axis.

13 Claims, 13 Drawing Sheets

(52) U.S. Cl.
CPC .... *Y10T 156/1348* (2015.01); *Y10T 156/1788* (2015.01); *Y10T 156/18* (2015.01)

(58) Field of Classification Search
CPC ... B32B 37/10; B32B 37/003; B29C 63/0073; B29C 63/0078; B29C 63/0047; B29C 66/345; B29C 63/02; B29C 70/38–388; B29L 2031/30; B29L 2031/3055; B29L 2031/328
See application file for complete search history.

(56) References Cited

U.S. PATENT DOCUMENTS

| | | | |
|---|---|---|---|
| 7,506,678 | B2 | 3/2009 | Degawa et al. |
| 11,155,026 | B2 | 10/2021 | Aihara et al. |
| 2006/0169398 | A1 | 8/2006 | Haibistritinger et al. |
| 2014/0027037 | A1* | 1/2014 | Calman ................... B32B 38/10 156/60 |
| 2016/0279915 | A1* | 9/2016 | Uemura ................. B32B 37/18 |
| 2020/0198918 | A1 | 6/2020 | Fujino et al. |

FOREIGN PATENT DOCUMENTS

| | | | |
|---|---|---|---|
| JP | S57181820 | A | 11/1982 |
| JP | 2667355 | B2 | 10/1997 |
| JP | 2555237 | Y2 | 11/1997 |
| JP | 2006520262 | A | 9/2006 |
| JP | 2006306618 | A | 11/2006 |
| JP | 2014094474 | A | 5/2014 |
| JP | 2018202669 | A | 12/2018 |
| JP | 3220260 | U | 2/2019 |
| JP | 2019099343 | A | 6/2019 |
| WO | 2018078486 | A1 | 5/2018 |
| WO | 2018150323 | A1 | 8/2018 |
| WO | 2020240414 | A1 | 12/2020 |

* cited by examiner

500

530

510

520

500

530

510

520

ROLLER, FILM ADHERING APPARATUS AND FILM ADHERING METHOD

CROSS REFERENCE TO RELATED APPLICATIONS

This application is a national stage filing under 35 U.S.C. 371 of PCT/IB2022/052558, filed Mar. 21, 2022, which claims the benefit of Japan Application No. 2021-047242, filed Mar. 22, 2021, the disclosure of which is incorporated by reference in its/their entirety herein.

BACKGROUND

In the related art, as technology of adhesively attaching a decorative film provided with a color, a pattern, or the like to a target object such as a roof portion of a vehicle, a film application device described in JP 2020-196154 A and an application device described in JP 3220260 U are known.

SUMMARY

Here, a roller that presses a film on an adhesive attachment target object by applying a load to the film has a cylindrical shape extending in a prescribed axial direction. In a case where a length in a rotation axis direction of the roller is shorter than a width of the film, a portion of the film is pressed by the roller, and subsequently the roller needs to be moved in the axial direction and needs to press the portion of the film again. In such a case, strain and deformation defects in an adhesive layer of the film occur at an end portion where the roller and the film come into contact with each other. Due to the strain and the deformation defects, an appearance problem referred to as a shock line occurs in a surface of the film, and design in terms of aesthetic appearance of the film after adhesive attachment is impaired.

A roller according to an aspect of the present disclosure includes a core portion having a cylindrical shape, a support portion located on a central axis of the core portion and configured to rotatably support the core portion, a foam body covering an entire circumference of the core portion and including an outer circumferential surface being flat, an operation portion configured to operate the foam body, and a fixing portion configured to fix the support portion and the operation portion, and at least one of end portions of the outer circumferential surface bends toward a direction of the central axis.

In the roller according to another aspect, an air bubble in the outer circumferential surface may have a diameter of less than or equal to 1.5 mm.

In the roller according to another aspect, a value of the outer circumferential surface of the foam body measured by using an Asker C durometer is greater than or equal to C7 and less than or equal to C20.

In the roller according to another aspect, the end portion that bends may have a radius of greater than or equal to 5 mm.

In the roller according to another aspect, the fixing portion may include a weight enabling adjustment of a load for pressing the foam body.

In the roller according to another aspect, the weight may include a plurality of weights, and each of the plurality of weights may be provided near or at the support portion.

A film application device according to an aspect of the present disclosure is a film application device adhesively attaching a film to a target object, the film application device including a roller configured to adhesively attach the film to the target object, and a control unit configured to control movement of the roller, wherein the roller includes a core portion having a cylindrical shape, a support portion located on a central axis of the core portion and configured to rotatably support the core portion, a foam body covering an entire circumference of the core portion and including an outer circumferential surface being flat, an operation portion configured to operate the foam body, and a fixing portion configured to fix the support portion and the operation portion, at least one of end portions of the outer circumferential surface bends toward a direction of the central axis, and the control unit performs six-axis control on the roller.

The film application device according to another aspect may further include a sensor configured to sense a load for pressing the roller, and the control unit may apply a load to the roller, based on data from the sensor.

In the film application device according to another aspect, the load may be greater than 0.4 N/cm and less than 1.8 N/cm.

The film application device according to another aspect, the target object may include a protruding portion or a recess portion, the film application device may include a local pressing tool configured to adhesively attach the film to a root portion of the protruding portion or the recess portion, and the control unit may independently perform six-axis control on the roller and the local pressing tool.

In the film application device according to another aspect, a value of a pressing surface of the local pressing tool measured by using an Asker A durometer may be greater than or equal to A20.

A film application method according to an aspect of the present disclosure is a film application method of adhesively attaching a film to a target object by using a roller, the roller including a core portion having a cylindrical shape, a support portion located on a central axis of the core portion and configured to rotatably support the core portion, a foam body covering an entire circumference of the core portion and including an outer circumferential surface being flat, an operation portion configured to operate the foam body, and a fixing portion configured to fix the support portion and the operation portion, at least one of end portions of the outer circumferential surface bending toward a direction of the central axis, and the film application method may include adhesively attaching a portion of the film by using the roller, moving the roller to a position where the outer circumferential surface of the foam body is located at the portion of the film, and a position where the outer circumferential surface of the foam body is located at the other portion of the film adjacent to the portion of the film, and pressing the portion of the film and the other portion of the film by the outer circumferential surface of the foam body.

In the film application method according to another aspect, a load for pressing the roller may be set to a range of greater than 0.4 N/cm and less than 1.8 N/cm.

A film application method according to an aspect of the present disclosure is a film application method of adhesively attaching a film to a target object including a recess portion or a protruding portion by using a roller and a local pressing tool for pressing a root portion of the recess portion or the protruding portion, the roller including a core portion having a cylindrical shape, a support portion located on a central axis of the core portion and configured to rotatably support the core portion, a foam body covering an entire circumference of the core portion and including an outer circumferential surface being flat, an operation portion configured to operate the foam body, and a fixing portion configured to fix the support portion and the operation portion, at least one of end portions of the outer circumferential surface bending toward a direction of the central axis, and the film application method may include adhesively attaching the film to the target object except for the root portion by using the roller, and adhesively attaching the film to the root portion by using the local pressing tool.

According to the present disclosure, even when a roller is moved in an axial direction and presses a film again, occurrence of a shock line is prevented, and design in terms of aesthetic appearance of the film after adhesive attachment improves.

DESCRIPTION OF EMBODIMENTS

Hereinafter, embodiments of the present disclosure will be described in detail with reference to the accompanying drawings. Note that in the following description, the same or equivalent components are denoted by the same reference signs, and redundant description of these components will be omitted.

Figures 1A, 1B:
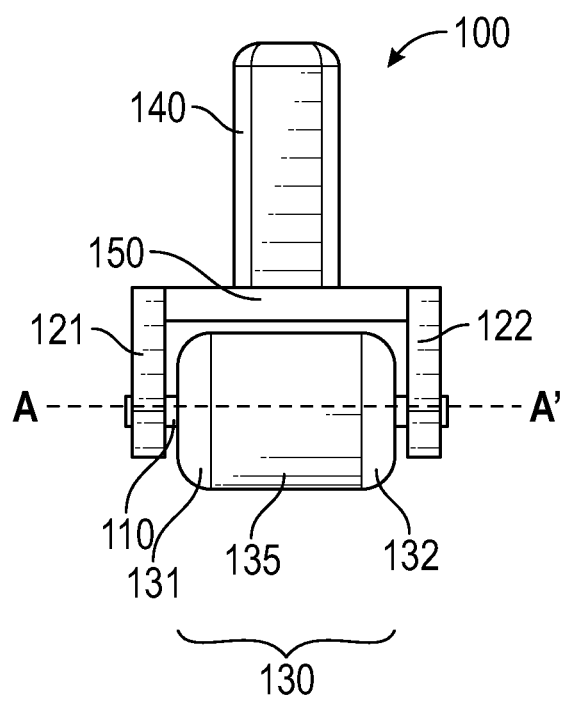
FIG. 1A is a front view illustrating a roller according to an embodiment of the disclosure.
FIG. 1B is a perspective view illustrating the roller according to an embodiment of the disclosure.

A configuration of a roller according to an embodiment of the disclosure will be described with reference to FIGS. 1A, 1B, 2A, and 2B. FIGS. 1A and 1B are views illustrating a roller according to the present embodiment, FIG. 1A is a front view, and FIG. 1B is a perspective view. A roller 100 is a roller that adhesively attaches a decorative film (hereinafter simply referred to as a film) to a target object, and may be referred to as a film attachment roller.

The film used in an embodiment of the disclosure is a decorative film including an adhesive portion (a portion to which an adhesive agent (e.g., pressure-sensitive adhesive) is applied) in a back surface and provided with a color, a pattern, or the like. The decorative film is used as a painting substitution film in, for example, application of adhesively attaching a film instead of painting. Any adhesive attachment target object can be employed as long as a design surface needs to be formed in the adhesive attachment 30 target object.

In a case where an exterior of a vehicle such as an automobile is decorated, the target object to which the film is adhesively attached is a roof portion (also referred to as a roof), a side surface portion, a column portion, a hood portion, a trunk lid portion, a back door portion, or the like. The roof portion is substantially flat, and includes a curved face having a gentle sloping angle from a horizontal surface. The roof portion may partly have an uneven shape. In an embodiment of the disclosure, a site in the roof portion except for the uneven shape is referred to as a substantially flat surface. Additionally, the side surface portion and the column portion each include an elongate protruding curved face having a steep sloping angle.

The roller 100 includes a core portion 110 having a cylindrical shape, support portions 121, 122 located on a central axis AA' of the core portion 110 and configured to rotatably support the core portion 110, and a foam body 130 covering an entire circumference of the core portion 110 and including an outer circumferential surface 135 being flat, an operation portion 140 configured to operate the foam body 130, and a fixing portion 150 configured to fix the support portions 121, 122 and the operation portion 140. At least one of end portions 131, 132 of the outer circumferential surface 135 bends toward a direction of the central axis AA'. Both the end portions may bend toward the direction of the central axis AA'.

The core portion 110 has a cylindrical shape. The core portion 110 may be located on the central axis AA'. The core portion 110 may penetrate the foam body 130. Additionally, the core portion 110 may protrude from the end portions 131, 132 of the foam body 130.

The support portions 121, 122 rotatably support the core portion 110 located on the central axis AA'. For example, the support portions 121, 122 are each provided with a hole on the central axis AA'. Both ends of the core portion 110 are fitted into the holes, and thus the core portion 110 becomes rotatable.

The foam body 130 covers the entire circumference of the core portion 110. The outer circumferential surface 135 of the foam body 130 is flat. At least one of the end portions 131, 132 of the outer circumferential surface 135 bends toward the direction of the central axis AA'. Both the end portions may bend toward the direction of the central axis AA'. As for a dimension of the foam body having a cylindrical shape, for example, an external diameter (a diameter of an outer side) is approximately 50 mm, an inside diameter (a diameter of an inner side) is approximately 10 mm (corresponding to a diameter of the core portion 110), and a length in the direction of the central axis AA' is approximately 80 mm. Here, the length in the direction of the central axis AA' is not particularly limited, and is, for example, 110 mm in the case of a roller including a weight enabling adjustment described below. Additionally, in a case where the target object includes no bead described below, the length in the direction of the central axis AA' may be approximately a vehicle width.

The operation portion 140 operates the foam body 130. In a case where an operator holds the roller 100 by hand to adhesively attach the film to the target object, the operation portion 140 is used as a handle, and facilitates a work step of adhesively attaching the film to the target object. Additionally, the operation portion 140 is also used as an attachment portion attached to a robot arm described below.

The operation portion 140 can operate the roller 100 in six axial directions. Additionally, the operation portion 140 is also used as an attachment portion attached to a robot arm described below.

In a case where the target object to which the film is adhesively attached is a roof portion of an automotive vehicle, the roof portion does not include a two-dimensional flat surface that simply widens in a vehicle length direction and a vehicle width direction, but includes a gentle three-dimensional curved face having a small curvature in a vehicle height direction. In a case where the film is adhesively attached to such a roof portion including the curved face, first, a periphery of the film is pulled at a position that is separate from the roof portion by a prescribed distance in the vehicle height direction, the operation portion 140 is lowered from a position that is farther separate from the roof portion in the vehicle height direction, and in a state where the foam body 130 presses the film on the roof portion by applying a prescribed load to the film and the roof portion, the operation portion 140 is moved, for example, in the vehicle length direction such that the foam body 130 rotationally moves. Next, the operation portion 140 is operated in the vehicle height direction to move the roller to a position that is separate from the film, and the roller returns to a location corresponding to the start of the pressing, and moves from the location by a prescribed distance in the vehicle width direction (corresponding to the direction of the central axis AA'). Then, the operation portion 140 is lowered in the vehicle height direction, and in a state where the pressing is performed by applying a prescribed load to the foam member 130, the operation portion 140 is moved again in a direction parallel to the direction of the immediately preceding pressing and moving operation such that the foam body 130 rotationally moves. Such movement may be repeated at the roof portion including the gentle three-dimensional curved face.

The fixing portion 150 fixes the support portions 121, 122 and the operation portion 140.

Figure 2A:
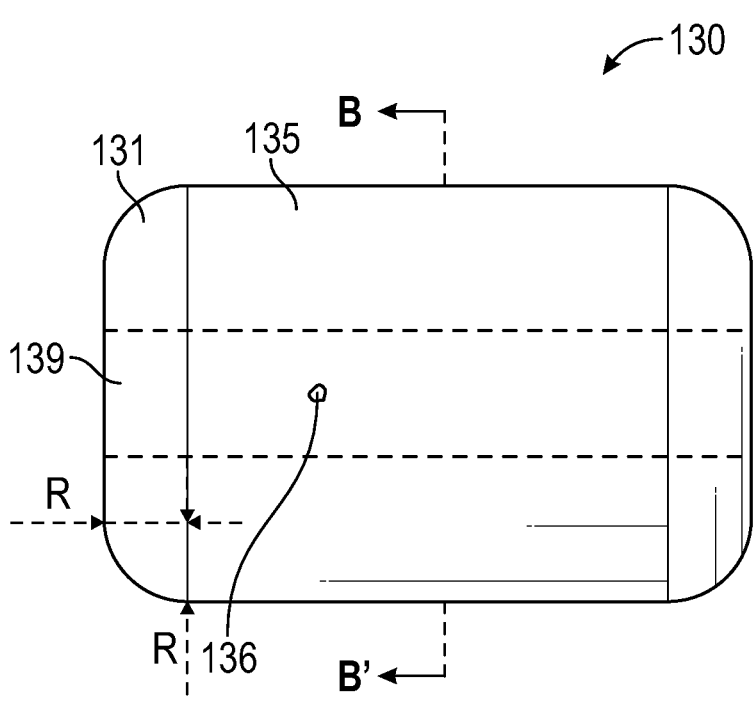
FIG. 2A is a front view illustrating a foam body according to an embodiment of the disclosure.
Figure 2B:
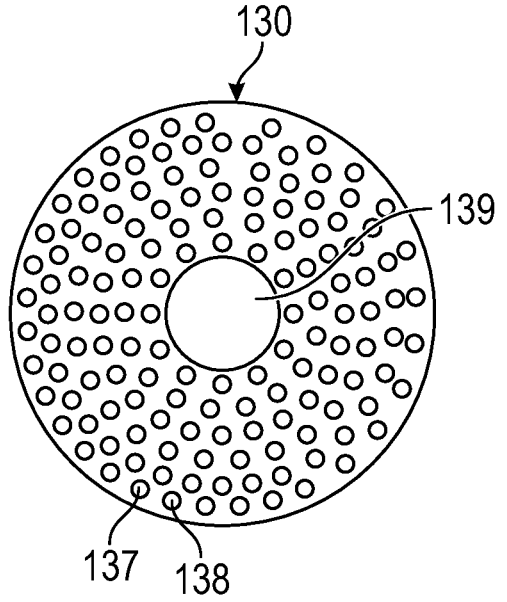
FIG. 2B is a cross-sectional view illustrating the foam body according to an embodiment of the disclosure.

FIGS. 2A and 2B are views illustrating the foam body according to an embodiment of the disclosure, FIG. 2A is a front view of the foam body 130, and FIG. 2B is a cross-sectional view of the foam body 130 taken along line BB', as viewed from a direction of an arrow.

The outer circumferential surface 135 of the foam body is flat. Here, the outer circumferential surface 135 may be smooth. The outer circumferential surface 135 may be referred to as a smooth surface skin layer. An air bubble 136 may be present on the outer circumferential surface 135. The number of the air bubbles 136 is not particularly limited, and a plurality of the air bubbles 136 may be present. The air bubble 136 preferably has a diameter of less than or equal to 1.5 mm. When the diameter exceeds 1.5 mm, a shape of the air bubble 136 may be transferred to the film. Additionally, the outer circumferential surface 135 of the foam body 130 may be provided with a thin non-foamable layer to the extent that pliability of the foam body 130 is not impaired.

A hollow portion 139 indicated by a dotted line is large enough for the core portion 110 to penetrate the hollow portion 139. The end portion 131 of the outer circumferential surface 135 bends toward the hollow portion 139. An entire circumference of the end portion 131 is, for example, chamfered and formed by a radius (R) of 5 mm. Forming means is not particularly limited, but means such as molding, machining, or polishing can be used. From the perspective of mass productivity, polishing may be used. According to such chamfering, an end surface of the foam body 130 (an end surface including the inside that is made hollow by the hollow portion 139) and the outer circumferential surface 135 are connected via a curved face having the R of 5 mm. The R of the curved face may be greater than or equal to 5 mm. Depending on the R of the chamfering, a connecting portion with the end surface may be discontinuous, and the chamfering may include all the end portion, and a chamfered region may directly be connected to the core portion 110. Note that when the R is less than 5 mm, a shock line may appear.

As illustrated in FIG. 2B, the foam body 130 covering an entire circumference of the hollow portion 139 includes a plurality of air bubbles, and many of the air bubbles are independent. For example, an air bubble 137 is independent of an air bubble 138. Note that even when some of the air bubbles are continuous to one another, there is substantially no problem.

A raw material of the foam body 130 is a foamable polyurethane resin. In a case where the raw material is polyurethane, the surface skin layer corresponding to the outer circumferential surface 135 becomes thin and soft. In the present disclosure, the roller 100 may be referred to as a soft roller. Additionally, the raw material of the foam body 130 may be acrylonitrile butadiene rubber (NBR), silicone, chloroprene rubber (CR), or ethylene propylene rubber (EPDM).

A value of the outer circumferential surface 135 of the foam body 130 measured by using an Asker C durometer may be greater than or equal to C7 and less than or equal to C20. When the value is less than C7, at the time when the foam body 130 (used as a pressing portion) presses the film by applying a load to the film, the film may be attached adhesively to the roller 100 due to the effect of viscosity of the foam body 130. When the value exceeds C20, at the time when the film is adhesively attached to the target object, a shock line may appear. Here, the Asker C durometer is a durometer defined by JIS standard K 7312.

The operation and the action and effect of the roller according to an embodiment of the disclosure will be described with reference to FIGS. 3A to 5B. Here, a film application method will be described, and the film application method includes rotating the roller in a state where pressing is performed by applying a load to the roller, and adhesively attaching a film. A portion of the roller is illustrated to explain a load F applied to the roller and movement M of the roller.

Figure 3A:
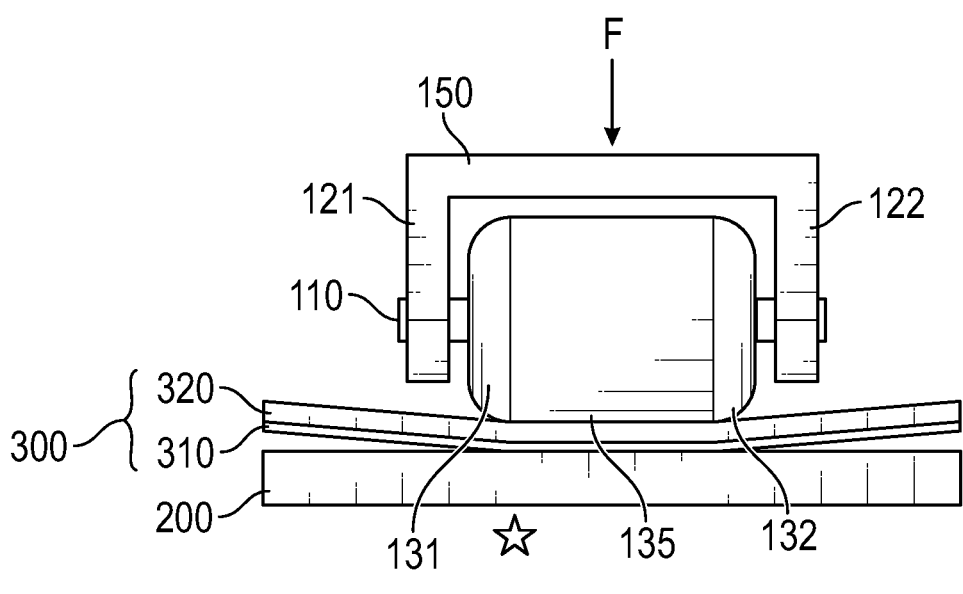
FIG. 3A is an explanatory front view of a film application method (1) according to an embodiment of the disclosure.
Figure 3B:
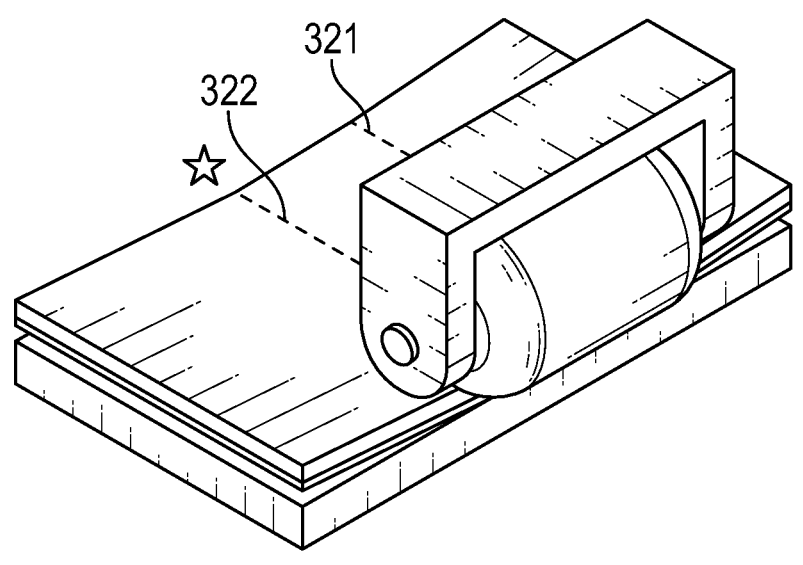
FIG. 3B is an explanatory perspective view of the film application method (1) according to an embodiment of the disclosure.

FIGS. 3A and 3B are explanatory drawings of a film application method (1) according to an embodiment of the disclosure, FIG. 3A is a front view of a portion of the roller, and FIG. 3B is a perspective view of the portion of the roller.

Before a film 300 is adhesively attached, an outer circumference of the film 300 is pulled to prevent the outer circumference of the film 300 from coming into contact with a target object (here, a roof portion of an automobile) 200, and the outer circumference of the film 300 keeps rising from the target object 200. The film 300 includes an adhesive layer 310 that bonds to the target object 200, and a film surface layer 320 provided with a color, a pattern, or the like.

As illustrated in FIG. 3A, the outer circumferential surface 135 of the foam body is pressing with the load F in a direction perpendicular to the target object 200 via the fixing portion 150 and the support portions 121, 122. In this state, the outer circumferential surface 135 rotationally moves, and thus the target object 200 and the adhesive layer 310 bond to each other, and the target object 200 is provided with a color, a pattern, or the like by the film surface layer 320. Here, a star indicates a boundary between a region under the outer circumferential surface 135 of the foam body where adhesive attachment is complete and an non-adhesive attachment region under the end portion 131. The non-adhesive attachment region refers to a region where the adhesive layer 310 is not bonded to the target object 200, that is, the adhesive layer 310 is rising from the target object 200.

FIG. 3B is a perspective view of a portion of the film bonded to the target object by the roller, as obliquely viewed from above. A trajectory line 322 virtually indicates a trajectory along which the star (the boundary between the outer circumferential surface 135 and the end portion 131 of the foam body) has moved. No trace such as the trajectory line 322 is left in the film surface layer 320, but one side of the trajectory line 322 bonds to the target object 200, and the other side of the trajectory line 322 is not bonded to the target object 200. Thus, the boundary between the adhesive attachment region and the non-adhesive attachment region is temporarily visible like a line at substantially the same position as a position of the trajectory line 322 due to the effect of light, and the boundary is not a shock line.

Similarly, a trajectory line 321 virtually indicates a trajectory along which a boundary between the outer circumferential surface 135 and the other end 132 of the foam body has moved. No trace like the trajectory line 321 is left in the film surface layer 320, but one side of the trajectory line 321 bonds to the target object 200, and the other side of the trajectory line 321 is not bonded to the target object 200.

Thus, the trajectory line 321 is a line temporarily visible due to the effect of light and is not a shock line.

Figure 4A:
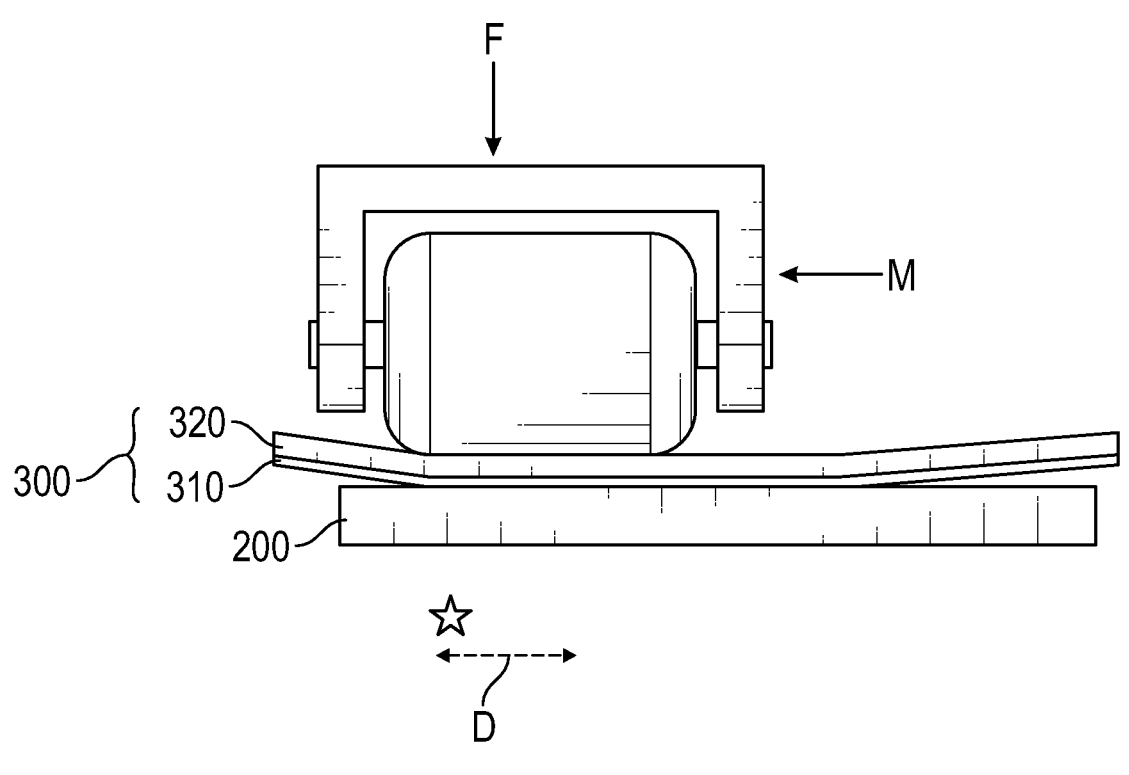
FIG. 4A is an explanatory front view of a film application method (2) according to an embodiment of the disclosure.
Figure 4B:
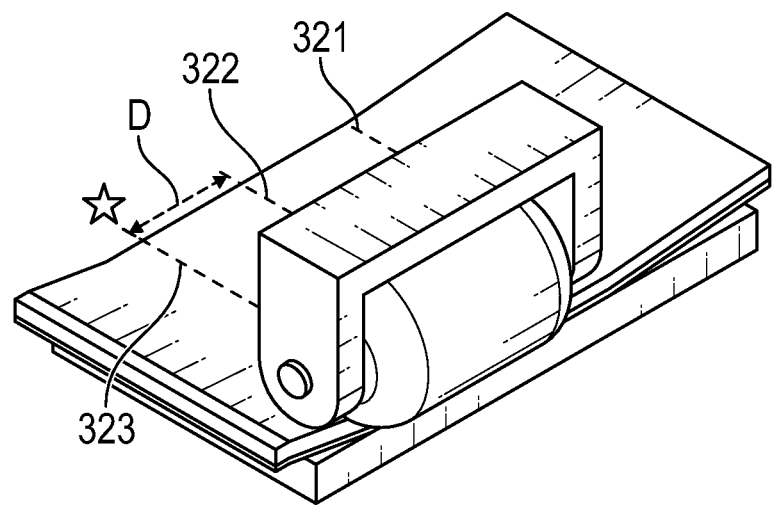
FIG. 4B is an explanatory perspective view of the film application method (2) according to an embodiment of the disclosure.

FIGS. 4A and 4B are explanatory drawings of a film application method (2) according to an embodiment of the disclosure, FIG. 4A is a front view of a portion of the roller, and FIG. 4B is a perspective view of the portion of the roller.

As described with reference to FIGS. 3A and 3B, after a portion of the film is adhesively attached by the roller, the roller is moved in a direction of the M, and the portion of the film is adhesively attached again by the roller. D denotes a distance by which the roller has moved in the direction of the M. The distance D may be in the range of a length in the direction of the M of the outer circumferential surface 135. The roller may be moved to a position where the roller is across the boundary line between the adhesive attachment region and the non-adhesive attachment region, and the boundary line is located at substantially the same position as the position of the trajectory line 322. Here, the position where the roller is across the boundary line is a position through which the outer circumferential surface 135 can pass.

Here, positioning in a height direction of the roller after the movement in the direction of the Mis performed in a state where the roller is in contact with the film without applying a load to the film 300, or is performed in a state where the roller is separate from the film. Additionally, attachment using water may be performed, and in the attachment using water, a surface of the target object 200 is wet with water, and subsequently the film 300 is attached to the surface of the target object 200. Such attachment using water may be necessary for temporary attachment and air release. In a case where the target object includes no bead described below, the film may be attached once in the vehicle width direction, and then attached in the vehicle length direction as appropriate.

FIG. 4B is a view illustrating a portion of the film bonded to the target object by rotationally moving the roller twice, as diagonally viewed from above. The boundary line between the adhesive attachment region and the non-adhesive attachment region located at substantially the same position as the position of the trajectory line 322 illustrated in FIG. 3B is invisible in FIG. 4B. This is because both sides of the boundary line illustrated in FIG. 3B is bonded to the target object 200. Note that the trajectory line 321 and a trajectory line 323 are lines that are temporarily visible due to the effect of light, and are not a shock line as described with reference to FIG. 3B.

Figure 5A:
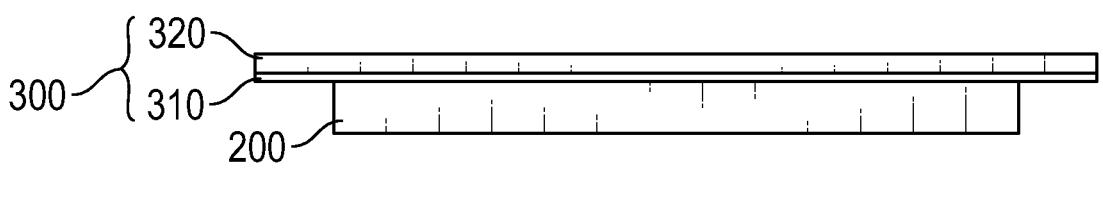
FIG. 5A is an explanatory front view of a film application method (3) according to an embodiment of the disclosure.
Figure 5B:
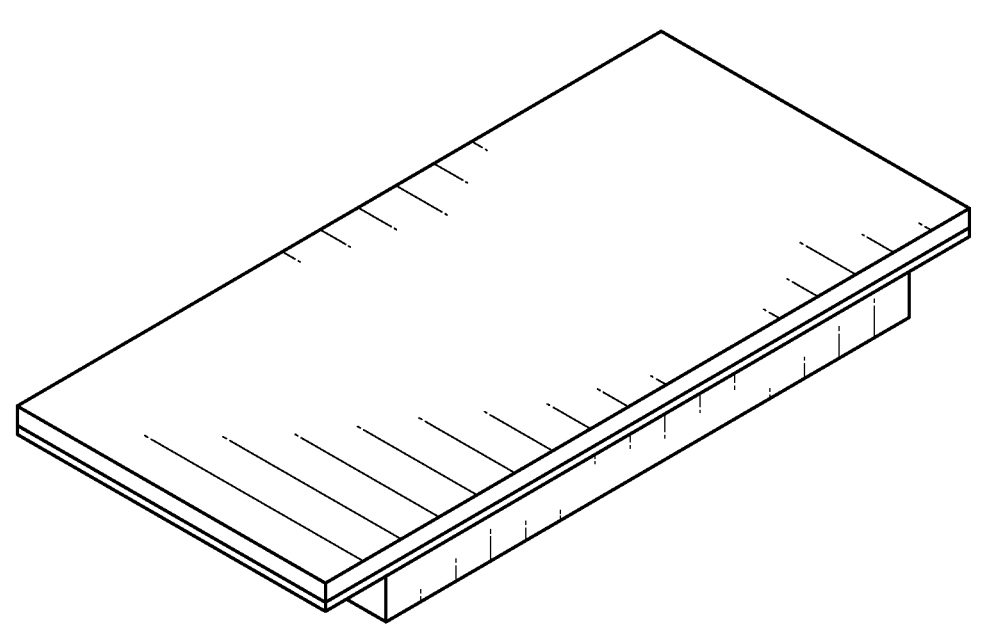
FIG. 5B is an explanatory perspective view of the film application method (3) according to an embodiment of the disclosure.

FIGS. 5A and 5B are explanatory drawings of a film application method (3) according to an embodiment of the disclosure. FIG. 5A is a front view of the film 300 adhesively attached to the target object 200, and FIG. 5B is a perspective view of the film 300 adhesively attached to the target object 200. As can be seen in the drawings, when the film is adhesively attached by the roller according to an embodiment of the disclosure, no shock line appears in the film surface layer 320.

With reference to FIGS. 3A to 5B, the example of starting adhesive attachment by the roller at the center of the film 300 is described. However, in a case where adhesive attachment of the film 300 is started at an end of the film 300 and the film 300 is adhesively attached from the end to the other end of the film 300 while the roller moves in the direction of the M of FIG. 4A, as long as an entire circumference of the end portion 131 of FIG. 3A in the outer circumferential surface of the foam body is chamfered and formed, a shock line does not appear even when the end portion 132 is not chamfered and formed.

Figure 6A:
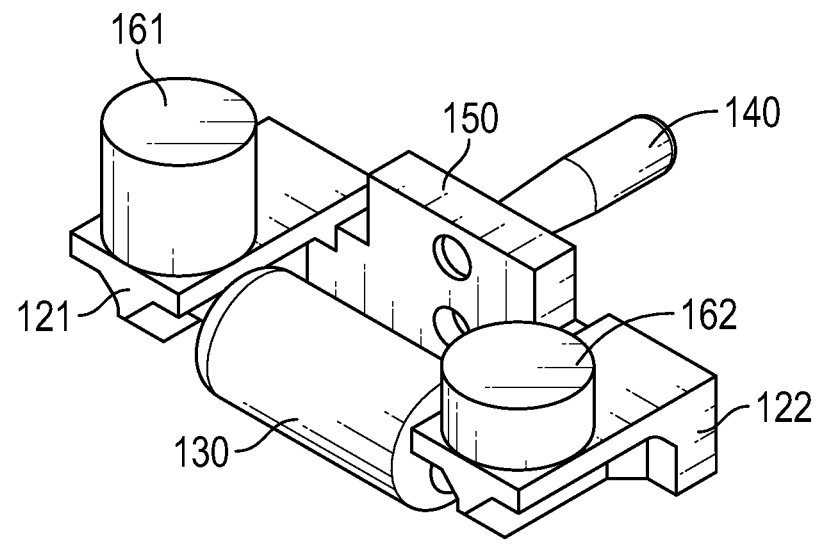
FIG. 6A is a top perspective view illustrating a roller including a weight enabling adjustment, according to an embodiment of the disclosure.
Figure 6B:
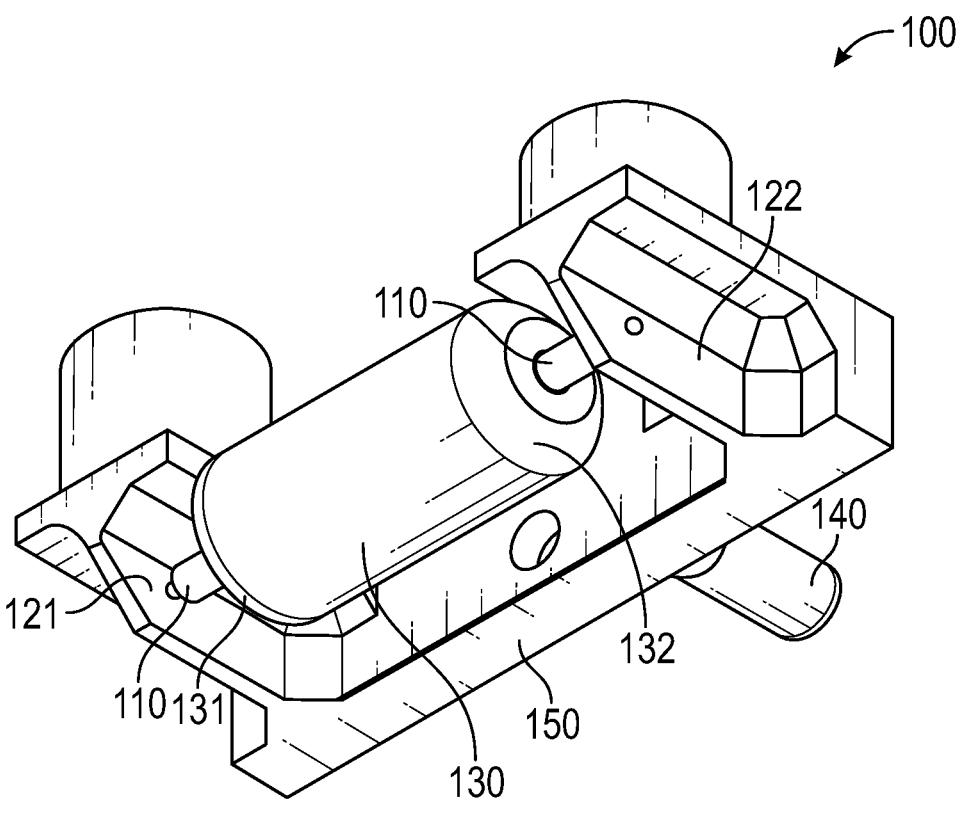
FIG. 6B is a bottom perspective view illustrating the roller including the weight enabling adjustment, according to an embodiment of the disclosure.

FIGS. 6A and 6B are views illustrating a roller including a weight enabling adjustment, according to an embodiment of the disclosure, FIG. 6A is a top perspective view, and FIG. 6B is a bottom perspective view. The roller of FIGS. 6A and 6B differs from the roller of FIGS. 1A and 1B in that the roller of FIGS. 6A and 6B includes a weight enabling adjustment of a load for pressing a foam body 130. Components having the same functions are denoted by the same reference signs.

To provide a space in which a weight is placed, support portions 121, 122 are wider than the support portions 121, 122 of FIGS. 1A and 1B. In FIGS. 6A and 6B, a weight 161 on the support portion 121 side is larger and heavier than a weight 162 on the support portion 122 side. Thus, in the foam body 130, a load on the support portion 121 side becomes higher than a load on the support portion 122 side.

With use of such weights enabling adjustment, for example, even when a target object includes a inclined face having deferent heights, the film can be pressed on and adhesively attached to the target object with an appropriate range of a load applied to the roller described below, by rotationally moving the foam member 130 while the support portion 121 side of the foam member 130 is positioned higher than the support position 122 side.

With use of such weights enabling load adjustment, an optimal value of a load for adhesively attaching a target object and the film can be determined experimentally. Additionally, in a mass production stage of adhesive attachment, a roller 100 may have an appropriate weight. For example, weights of the support portions 121, 122, an operation portion 140, and a fixing portion 150 may be adjusted to appropriate weights. This enables adjustment in advance of the weights in the case of so-called attachment by hand in which an operator moves the roller 100 by hand. Additionally, in a case where a working robot operates the operation portion 140 of the roller 100, there is no need for load control, and only six-axis coordinate control may be performed.

The weight includes a plurality of weights such as the weights 161, 162 and the weights after adjustment are provided near or at the support portions 121, 122, respectively, and thus in a case where a target object includes a curved face, an appropriate range of a load can be applied to the foam body 130 by moving the roller 100 along the curved face. Here, near or at the support portions 121, 122 may refer to a region on extension of an axis of a core portion 110 supported by the support portions 121, 122.

A target object to which the film is adhesively attached may include a protruding portion or a recess portion. A local pressing tool configured to adhesively attaching the film to a root portion of the protruding portion or the recess portion will be described with reference to FIGS. 7A, 7B, 8A, and 8B. Here, the root portion of the protruding portion or the recess portion refers to a boundary between an inclined face connecting a first substantially flat surface located at a relatively low position with a second substantially flat surface located at a relatively high position, and the first substantially flat surface. Specifically, the root portion of the protruding portion refers to a peripheral edge portion of all the protruding portion, and the root portion of the recess portion refers to a peripheral edge portion of a surface corresponding to a bottom of the recess portion.

Figure 7A:
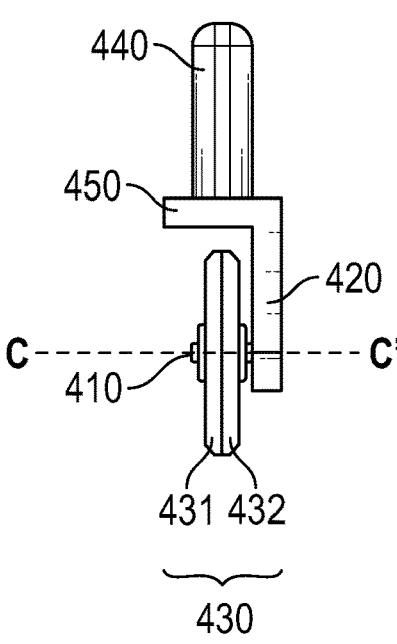
FIG. 7A is a front view illustrating a local pressing tool (1) according to an embodiment of the disclosure.
Figure 7B:
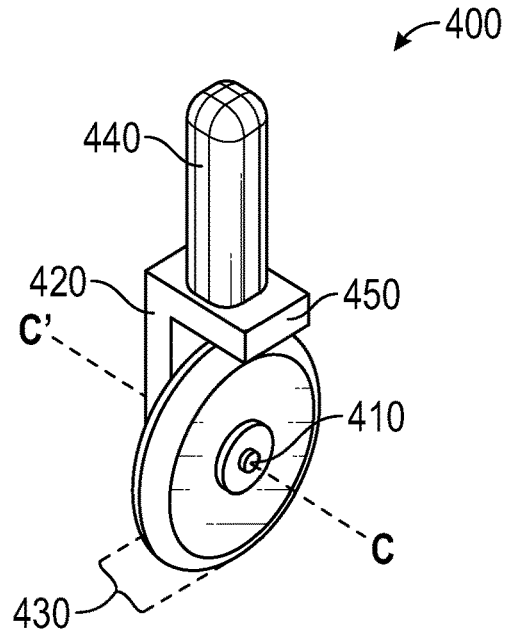
FIG. 7B is a perspective view illustrating the local pressing tool (1) according to an embodiment of the disclosure.

FIGS. 7A and 7B are views illustrating a local pressing tool (1) according to an embodiment of the disclosure, FIG. 7A is a front view, and FIG. 7B is a perspective view. In a case where a target object to which the film is adhesively attached is a roof portion of an automotive vehicle, a plurality of rows of reinforcing beads (a protruding bead or a recessed bead, hereinafter simply referred to as a bead) may be provided by a certain distance to impart rigidity to a roof panel having a large area. A bead roller 400 will be described as an example of the local pressing tool configured to adhesively attach the film to the root portion of the protruding portion or the recess portion of the bead.

The bead roller 400 includes a core portion 410 having a cylindrical shape, a support portion 420 located on a central axis CC' of the core portion 410 and configured to rotatably support the core portion 410, a pressing portion 430 covering an entire circumference of the core portion 410, an operation portion 440 configured to operate the pressing portion 430, and a fixing portion 450 configured to fix the support portion 420 and the operation portion 440.

The pressing portion 430 includes no portion corresponding to the outer circumferential surface 135 of the foam body 130, and includes two end portions 431, 432 that are hard. As the two end portions 431, 432 are viewed from front (in a direction in which the pressing portion 430 performs adhesive attachment while rotating), long sides of two trapezoids overlap each other, and both ends of the pressing portion 430 bend toward a direction of the central axis CC'. Since tip ends of the two end portions 431, 432 are pointed in a circumferential direction as described above, the film can be attached adhesively to the root portion of the protruding portion or the recess portion of the bead. Here, a value of a pressing surface of the pressing portion 430 measured by using an Asker A durometer is preferably greater than or equal to A20. Here, the Asker A durometer is a durometer defined in JIS K 6253-3.

As with the operation portion 140 of the roller 100, in a case where an operator holds the bead roller 400 by hand, the operation portion 440 may be used as a handle, and the operation portion 440 may be used as an attachment portion attached to a robot arm.

Figure 8A:
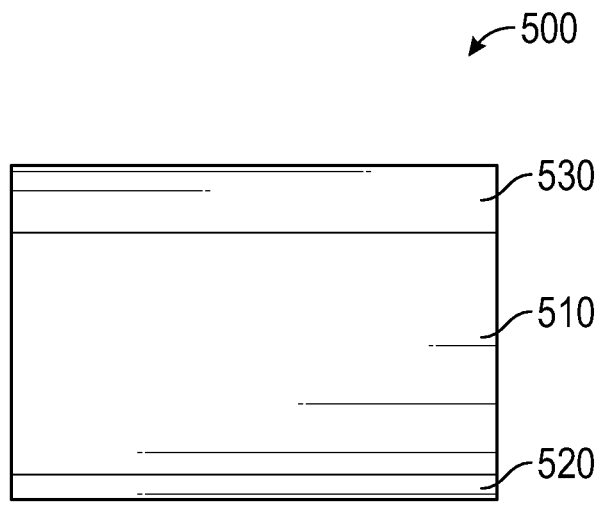
FIG. 8A is a front view illustrating a local pressing tool (2) according to an embodiment of the disclosure.
Figure 8B:
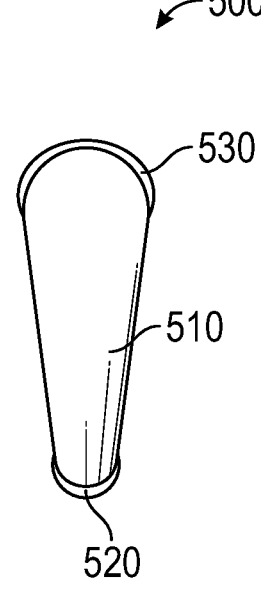
FIG. 8B is a side view illustrating the local pressing tool (2) according to an embodiment of the disclosure.

FIGS. 8A and 8B are views illustrating a local pressing tool (2) according to an embodiment of the disclosure, FIG. 8A is a front view, and FIG. 8B is a side view. A squeegee 500 will be described as an example of the local pressing tool configured to adhesively attach the film to the root portion of the protruding portion or the recess portion of the bead.

The squeegee includes a body portion 510 having a thin rectangular parallelepiped spatula shape, lower cloth 520 covering a lower surface part of the body portion, and upper cloth 530 covering an upper surface part of the body portion. The lower surface part and the upper surface part of the body portion 510 include curved faces, and the lower surface part has a curvature smaller than a curvature of the upper surface part. Thus, the lower cloth 520 is suitable for adhesively attaching the film in a case where the root portion of the protruding portion or the recess portion of the bead is thin or deep.

As for a raw material of the squeegee 500, wood is used for the body portion 510, and felt cloth is used for the lower cloth 520 and the upper cloth 530. Here, a value of a pressing surface of each of the lower cloth 520 and the upper cloth 530 measured by using the Asker A durometer is preferably greater than or equal to A20. Additionally, a sponge sheet having A20 may be used as the lower cloth 520 and the upper cloth 530.

A film application method in a case where eight protruding beads (four in the front and four in the rear) are attached to a roof portion of an automotive vehicle will be described with reference to FIGS. 9 to 15. Here, the case where a six-axis control unit of the roller 100 (soft roller) and the local pressing tool 400 (bead roller) is used will be described. However, a similar application method can also be used in the case of manual control.

Figure 9:
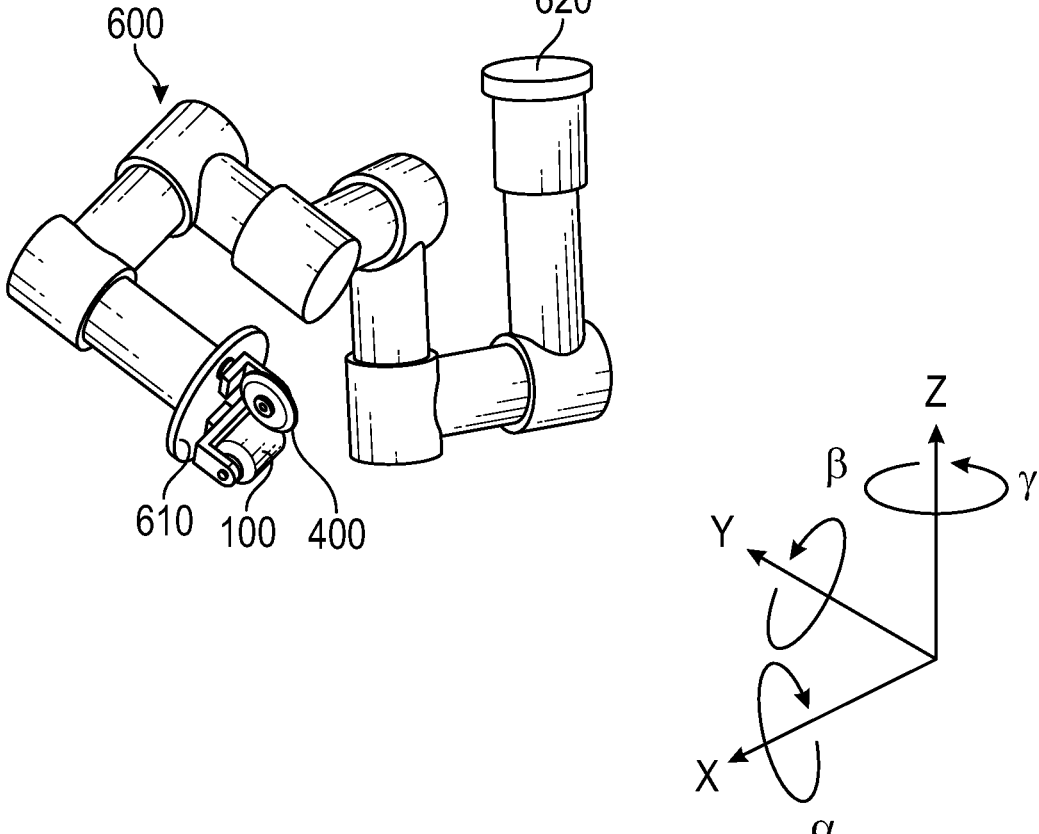
FIG. 9 is an explanatory drawing of a film application device according to an embodiment of the disclosure.

FIG. 9 is an explanatory drawing of a film application device according to an embodiment of the disclosure. A robot arm 600 operates as a control unit that can control the soft roller 100 and the bead roller 400 in six axial directions in cooperation with a control circuit or a control program that can perform 6-axis control. That is, the film application device according to an embodiment of the disclosure includes the robot arm 600 and the soft roller 100 and/or the bead roller 400.

The robot arm 600 includes an attachment portion 620 attached to an upper side (Z-axis) of a work space in which an automobile vehicle is installed. Additionally, the attachment portion 620 may be attached to a table provided on a floor near or at the work space. In any case, six-axis control may be performed with reference to a position of the attachment portion 620. Here, the six axes refer to a Z-axis in the same direction as the vehicle height direction, a rotation axis y of the Z-axis, an X-axis orthogonal to the Z axis, a rotation axis a of the X-axis, a Y-axis orthogonal to the Z-axis and the X axis, and a rotation axis B of the Y-axis.

In a case where a roof portion of the automobile vehicle is large, the attachment portion 620 of the robot arm 600 can move, and thus the film may be attached adhesively to the large roof portion. Additionally, a plurality of the robot arms 600 may be installed, and the film may be attached adhesively to the large roof portion by using the plurality of robot arms.

A tip end of the robot arm 600 may be provided with a dual gripper 610 as an end effector. The dual gripper 610 fixes (or chucks) the operation portions of the soft roller 100 and the bead roller 400. This enables tilting of each of the rotation axes without changing weights of the soft roller 100 and the bead roller 400.

In a case where the soft roller 100 is used, the robot arm 600 may be controlled in the six axial directions, and an angle of the robot arm 600 may be adjusted to move the bead roller 400 to a position where the bead roller 400 does not interfere with the soft roller 100. Alternatively, the dual gripper 610 may move the bead roller 400 to a position where the bead roller 400 does not interfere with the soft roller 100. In a case where the bead roller 400 is used, similarly, the angle of the robot arm 600 may be adjusted, or the dual gripper 610 may be moved.

In a tip end portion of the robot arm 600 or the dual gripper 610, a sensor such as a pressure sensor that is configured to sense a load may be provided at each of sites where the operation portions of the soft roller 100 and the bead roller 400 are fixed. The sensor configured to sense a load on the soft roller 100 and the bead roller 400 is provided, and feedback control is performed based on data from the sensor that has sensed the load, and thus the robot arm 600 can adjust the load on the soft roller 100 and the bead roller 400. Additionally, the sensor may be a sensor configured to sense a physical quantity other than pressure (for example, a load, strain, electrical resistance, displacement). Here, the load applied to the roller has a value equivalent to a load per unit length in the axial direction of the roller.

A lower limit of the load applied to the soft roller 100 is preferably greater than 0.4 N/cm. This is because when the load is less than the lower limit, the film may not appropriately be attached adhesively to a target object. Additionally, an upper limit of the load may be less than 1.8 N/cm. This is because occurrence of a shock line and the like can be suppressed. Further, the upper limit of the load is more preferably less than or equal to 0.9 N/cm. This is because a stable suppression effect of a shock line can further be expected immediately after adhesive attachment.

Figure 10:
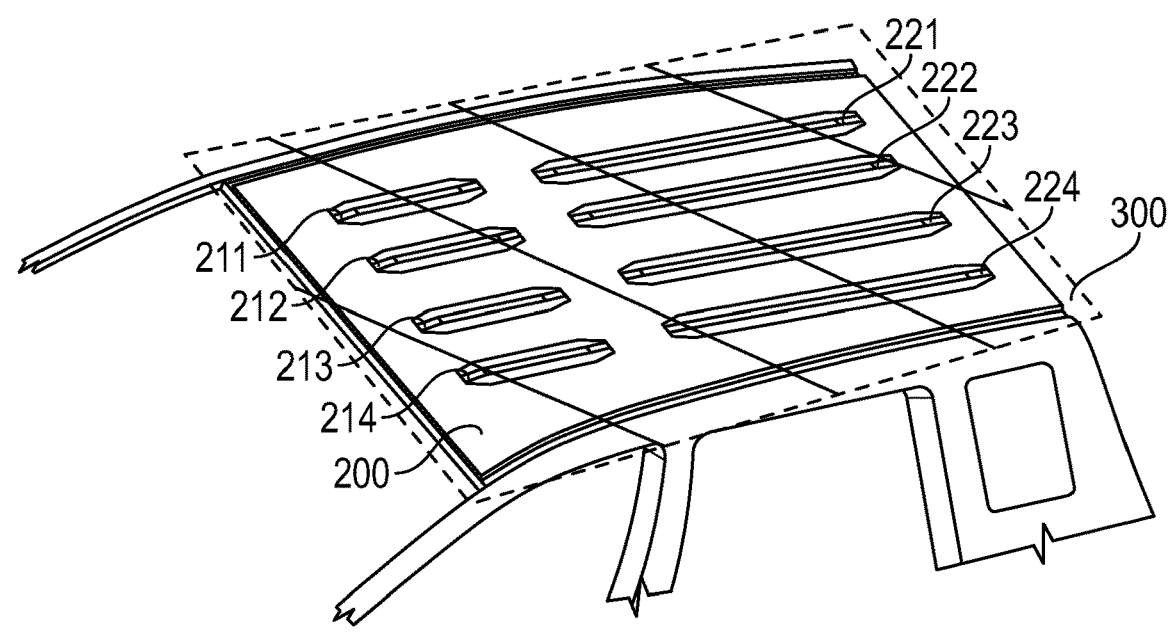
FIG. 10 is an explanatory drawing of a film and a target object to which the film is adhesively attached, according to an embodiment of the disclosure.

FIG. 10 is an explanatory drawing of the film and the target object to which the film is adhesively attached, according to an embodiment of the disclosure. The film 300 is placed on the target object 200 (the roof portion of the automobile vehicle) (in the vehicle height direction), and the film 300 is pulled in the vehicle length direction and the vehicle width direction. The target object 200 is provided with four protruding beads 211, 212, 213, and 214 in the front and four recessed beads 221, 222, 223, and 224 in the rear.

Figure 11:
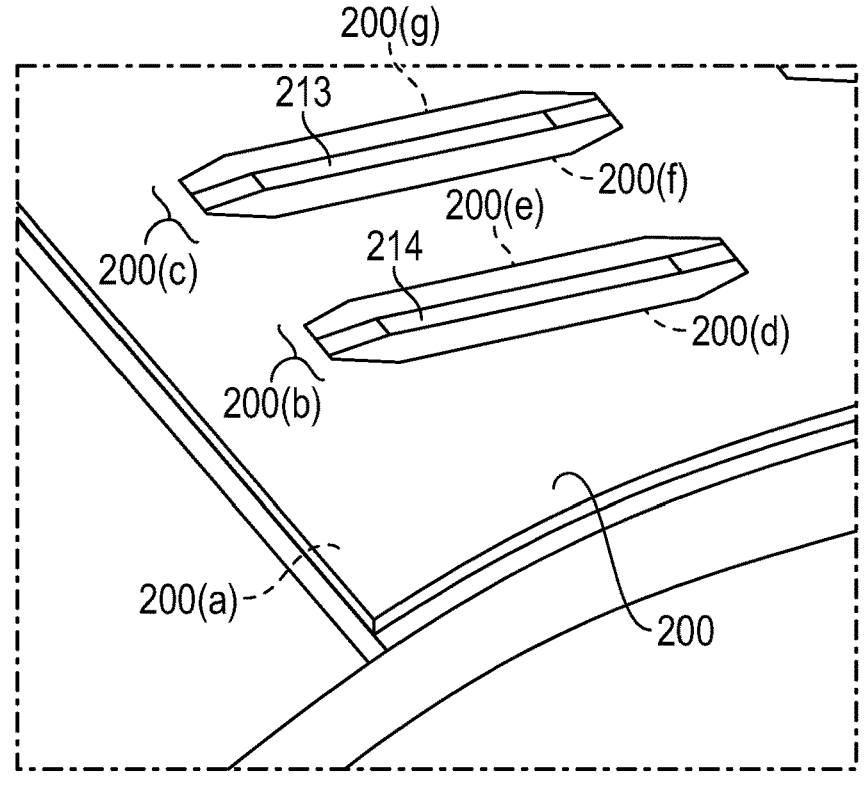
FIG. 11 is an explanatory drawing of the roller and the local pressing tool that are six-axis controllable, according to an embodiment of the disclosure.

FIG. 11 is an explanatory drawing of the roller (soft roller 100) and the local pressing tool (bead roller 400) that are six-axis controllable, according to an embodiment of the disclosure. With reference to FIG. 11, sites in the target object 200 (the roof portion of the vehicle) that are pressed by the soft roller 100 and the bead roller 400 will be described.

The soft roller 100 pressurizes a substantially flat surface (a portion without the beads 213 and 214) 200(*a*) of the roof portion 200 and protruding flat surfaces 200(*b*), 200(*c*) of the beads 213, 214. The protruding flat surfaces each include a substantially protruding curved face having a gentle curvature, or each have a generally gentle protruding shape including a combination of a substantially protruding curved face having a gentle curvature and a flat surface, and the protruding flat surfaces are suitable for being pressurized by the soft roller 100.

The protruding flat surfaces 200(*b*) and 200(*c*) refer to portions of the beads 213 and 214 except for root portions 200(*d*), 200(*e*), 200(*f*), 200(*g*). Since the soft roller 100 is six-axis controllable and is soft and rotates in a state where the foam body slightly dents, the protruding flat surfaces 200(*b*), 200(*c*) can rotationally move while applying a load.

On the other hand, as for the root portions of the protruding or recessed beads (in the case of FIG. 11, the root portions 200(*d*), 200(*e*), 200(*f*), 200(*g*) of the protruding beads), the bead roller 400 presses the root portions 200(*d*), 200(*e*), 200(*f*), 200(*g*). The soft roller 100 and the bead roller 400 are controllable to perform adhesive attachment freely in the six axial (the three coordinate axes and the three rotation axes) directions, and the soft roller 100 and the bead roller 400 are movable while pressing a complex curved face of the roof portion 200.

Here, since the bead roller 400 is a hard roller, a shock line may not occur in the film. However, note that since a load is applied on the root portions of the protruding or recessed beads (in the case of FIG. 11, 200(*d*), 200(*e*), 200(*f*), 200(*g*)), even when a shock line occurs in such peripheral edges, appearance of the target object 200 is less affected unlike in a substantially flat surface.

Figure 12:
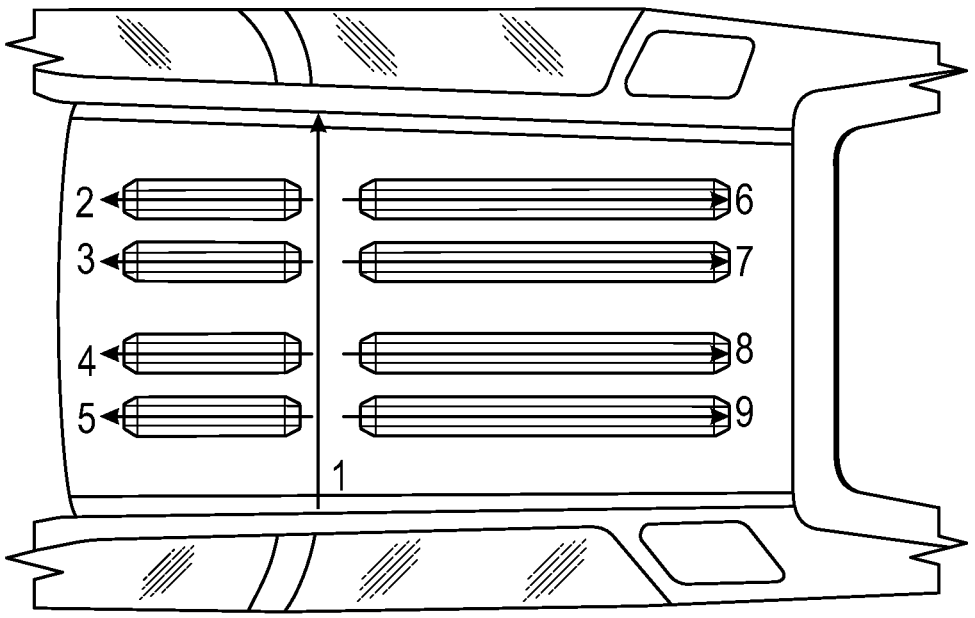
FIG. 12 is a view illustrating an operation direction (1) of the roller and the local pressing tool that are six-axis controllable, according to an embodiment of the disclosure.

FIG. 12 is a view illustrating an operation direction (1) of the roller (soft roller 100) and the local pressing tool (bead roller 400) that are six-axis controllable, according to an embodiment of the disclosure. Arrows 1 to 9 of FIG. 12 indicate moving directions of the soft roller 100. Here, since there are four protruding front beads and four protruding rear beads, first, the film is adhesively attached while a load is applied by the soft roller 100 to a region between the front beads and the rear beads (arrow 1). Next, a load is applied by the soft roller 100 to a substantially flat surface of each front bead in an outward direction of the roof portion (arrow 2 to 5). Further, a load is applied by the soft roller 100 to a substantially flat surface of each rear bead in an outward direction of the roof portion (arrow 6 to 9).

Figure 13:
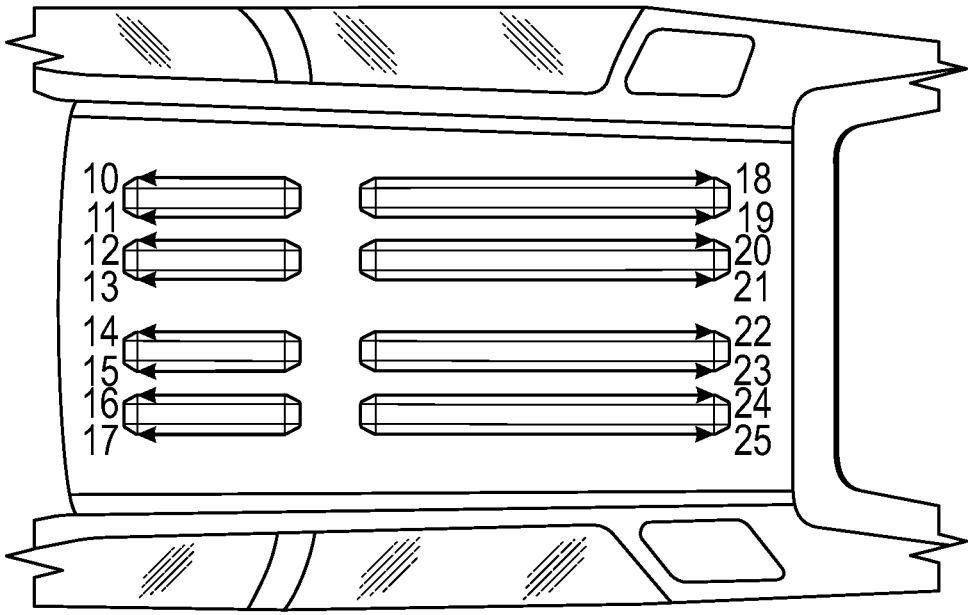
FIG. 13 is a view illustrating an operation direction (2) of the roller and the local pressing tool that are six-axis controllable, according to an embodiment of the disclosure.

FIG. 13 is a view illustrating an operation direction (2) of the roller (soft roller 100) and the local pressing tool (bead roller 400) that are six-axis controllable, according to an embodiment of the disclosure. Arrows 10 to 25 of FIG. 13 indicate moving directions of the bead roller 400. First, a load is applied by the bead roller 400 to a root portion of the protruding portion of each front bead in an outward direction of the roof portion (arrows 10 to 17). Thus, as for the front bead portions, the film can be attached adhesively to the roof portion with no air bubble left. Next, a load is applied by the bead roller 400 to a root portion of the protruding portion of each rear bead in an outward direction of the roof portion (arrows 18 to 25). Thus, as for the rear bead portions, the film can be attached adhesively to the roof portion with no air bubble left.

Figure 14:
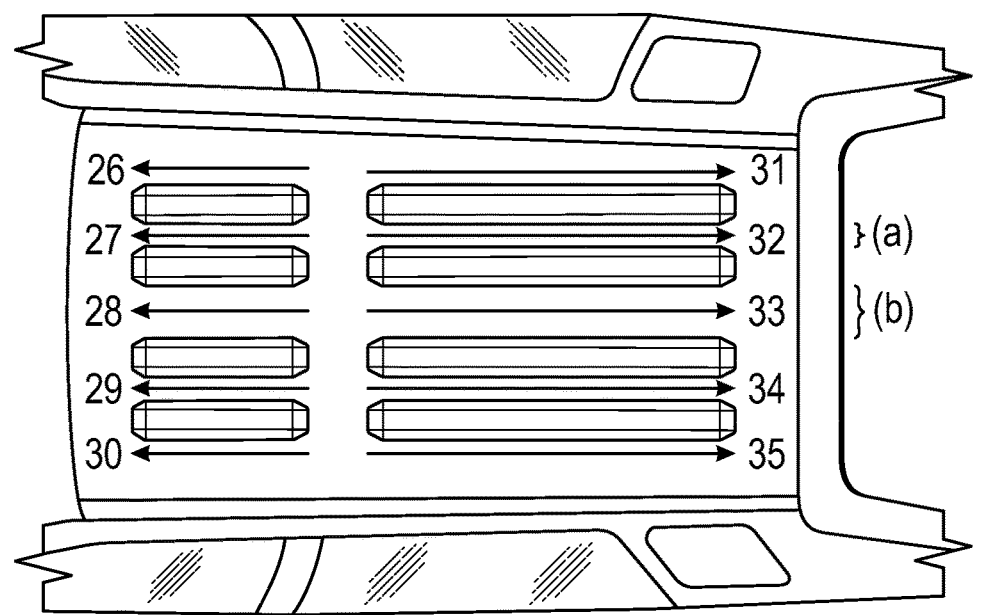
FIG. 14 is a view illustrating an operation direction (3) of the roller and the local pressing tool that are six-axis controllable, according to an embodiment of the disclosure.

FIG. 14 is a view illustrating an operation direction (3) of the (soft roller 100) and the local pressing tool (bead roller 400) that are six-axis controllable roller, according to an embodiment of the disclosure. Arrows 26 to 35 of FIG. 14 indicate moving directions of the soft roller 100. First, a load is applied by the soft roller 100 to a substantially flat surface between the front beads in an outward direction of the roof portion (arrows 26 to 30). Thus, as for the substantially flat surface between the front beads, the film can be attached adhesively to the roof portion with no air bubble left. Next, a load is applied by the soft roller 100 to a substantially flat surface between the rear beads in an outward direction of the roof portion (arrows 31 to 35). Thus, as for the substantially flat surface between the rear beads, the film can be attached adhesively to the roof portion with no air bubble left.

Here, in a case where the width between the beads is substantially equal to the width of the soft roller as in (a), only one stroke is required. On the other hand, in a case where the width between the beads is larger than the width of the soft roller as in (b), greater than or equal to two strokes are required. With use of the soft roller 100, occurrence of a shock line during a first stroke and a second stroke or during subsequent strokes can be prevented.

Figure 15:
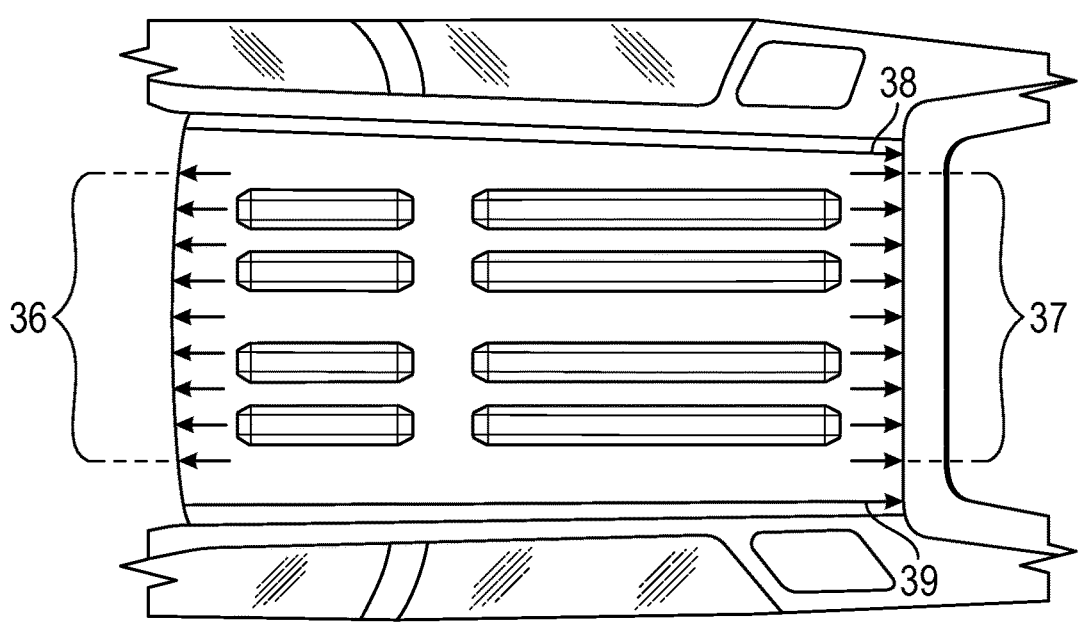
FIG. 15 is a view illustrating an operation direction (4) of the roller and the local pressing tool that are six-axis controllable, according to an embodiment of the disclosure.

FIG. 15 is a view illustrating an operation direction (4) of the roller (soft roller 100) and the local pressing tool (bead roller 400) that are six-axis controllable, according to an embodiment of the disclosure. Arrows 36 and 37 of FIG. 15 indicate moving directions of the soft roller 100. Arrows 38 and 39 indicate moving directions of the bead roller 400. First, a load is applied by the soft roller 100 to a substantially flat surface in a front portion of each front bead in an outward direction of the roof portion (arrow 36). Thus, as for the substantially flat surface in the front portion of each front bead, the film can be attached adhesively to the roof portion with no air bubble left. Next, a load is applied by the soft roller 100 to a substantially flat surface in a rear portion of each rear bead in an outward direction of the roof portion (arrow 37). Thus, as for the substantially flat surface in the rear portion of each rear bead, the film can be attached adhesively to the roof portion with no air bubble left. Subsequently, a load is applied by the bead roller 400 to portions corresponding to roof moldings on both sides of the roof portion (arrows 38 and 39).

As described above, the soft roller 100 and the bead roller 400 are moved while a load is applied in the outward directions of the roof portion, thus occurrence of a shock line at a site in the film corresponding to the flat surface of the roof portion can be prevented while appropriately performing air release of the adhesive layer of the film. Further, the film can reliably be attached adhesively to the root portion of the protruding portion of the bead and the roof molding portion in which a shock line is unnoticeable.

The order, the direction, and the like of application of the film described above can be changed as appropriate without deviating from the spirit of an embodiment of the disclosure. For example, in a case where the distance between the beads is wide, first, the region between the beads is compressed by the soft roller, and subsequently the root of each bead is compressed by the bead roller. However, in a case where the distance between the beads is narrow, first, the root of each bead may be compressed by the bead roller, and subsequently the region between the beads may be compressed by the soft roller.

Additionally, in a case where each bead of the roof portion 200 is a recessed bead, a load may be applied by the bead roller 400 only to the root portion of the recess portion of the bead, and a load may be applied by the soft roller 100 to the substantially flat portion other than the root portion.

Figure 16A:
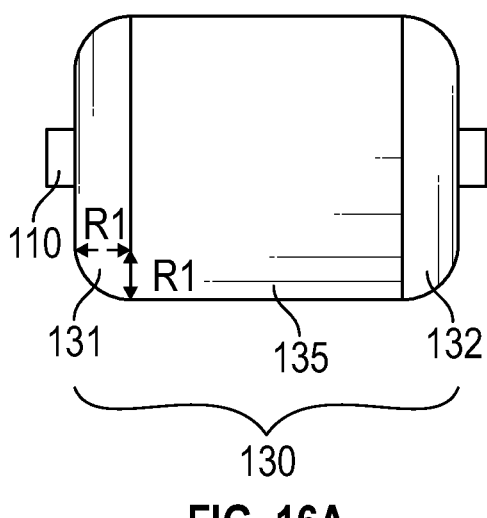
FIG. 16A is a view illustrating a modified example of rounding of a foam body, according to an embodiment of the disclosure.
Figure 16B:
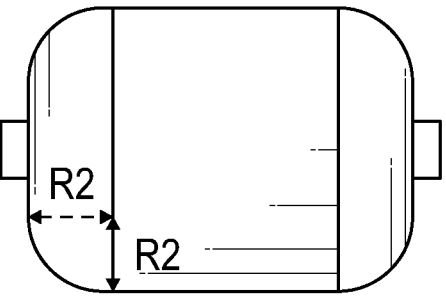
FIG. 16B is a view illustrating another modified example of rounding of a foam body, according to an embodiment of the disclosure.
Figure 16C:
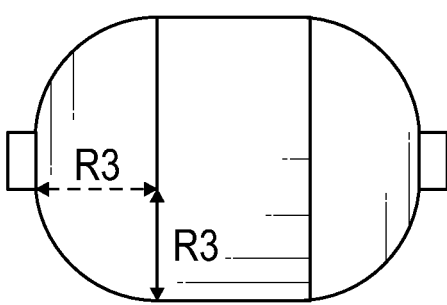
FIG. 16C is a view illustrating yet another modified example of rounding of a foam body, according to an embodiment of the disclosure.

FIGS. 16A, 16B, and 16C are views illustrating a modified example of rounding of the foam body 130, according to an embodiment of the disclosure. FIG. 16A illustrates the case where the R is 5 mm (R1). An upper limit of the R is not particularly limited, and the R may be large enough for the R to arrive at the core portion 110. FIG. 16C illustrates a radius (R3) in a case where the R arrives at the core portion 110. Of course, the R may have an intermediate value. FIG. 16B illustrates the case of an intermediate R (R2). Additionally, the R on the outer circumferential surface 135 side may be larger than the R of the core portion 110.

Note that, in the embodiments described above, the target object to which the film is applied is described as a vehicle as an example. However, the target object to which the film is applied is not limited to a vehicle, and may be any target object for mounting a film. Examples of such a target object may include a train, an aircraft, furniture, and an electric appliance.

REFERENCE SIGNS LIST

100 Roller (soft roller)
200 Target object
300 Film
400 Bead roller
500 Squeegee

The invention claimed is:

1. A roller comprising:
a core portion having a cylindrical shape;
a support portion located on a central axis of the core portion and configured to rotatably support the core portion;
a foam body covering an entire circumference of the core portion and comprising an outer circumferential surface being flat;
an operation portion configured to operate the foam body; and
a fixing portion configured to fix the support portion and the operation portion, wherein
at least one end portion of the outer circumferential surface bends toward a direction of the central axis,
wherein the fixing portion comprises a weight enabling adjustment of a load for pressing the foam body.

2. The roller according to claim 1, wherein an air bubble in the outer circumference surface has a diameter of less than or equal to 1.5 mm.

3. The roller according to claim 1, wherein a value of the outer circumference surface of the foam body measured by using an Asker C durometer is greater than or equal to C7 and less than or equal to C20.

4. The roller according to claim 1, wherein the end portion that bends has a radius of greater than or equal to 5 mm.

5. The roller according to claim 1, wherein the weight includes a plurality of weights, and each of the plurality of weights is provided near or at the support portion.

6. A film application device adhesively attaching a film to a target object, the film application device comprising:
  a roller configured to adhesively attach the film to the target object; and
  a control unit configured to control movement of the roller, wherein the roller comprises:
  a core portion having a cylindrical shape;
  a support portion located on a central axis of the core portion and configured to rotatably support the core portion;
  a foam body covering an entire circumference of the core portion and comprising an outer circumferential surface being flat;
  an operation portion configured to operate the foam body; and
  a fixing portion configured to fix the support portion and the operation portion, wherein the fixing portion comprises a weight enabling adjustment of a load for pressing the foam body;
  at least one end portion of the outer circumferential surface bends toward a direction of the central axis, and
  the control unit performs six-axis control on the roller.

7. The film application device according to claim 6 further comprising a sensor configured to sense a load for pressing the roller, wherein
  the control unit applies a load to the roller, based on data from the sensor.

8. The film application device according to claim 7, wherein the load is greater than 0.4 N/cm and less than 1.8 N/cm.

9. The film application device according to claim 6, wherein
  the target object comprises a protruding portion or a recess portion,
  the film application device comprises a local pressing tool configured to adhesively attach the film to a root portion of the protruding portion or the recess portion, and
  the control unit independently performs six-axis control on the roller and the local pressing tool.

10. The film application device according to claim 9, wherein a value of a pressing surface of the local pressing tool measured by using an Asker A durometer is greater than or equal to A20.

11. A film application method of adhesively attaching a film to a target object by using a roller,
  the roller comprising:
  a core portion having a cylindrical shape;

a support portion located on a central axis of the core portion and configured to rotatably support the core portion;
  a foam body covering an entire circumference of the core portion and comprising an outer circumferential surface being flat;
  an operation portion configured to operate the foam body; and
  a fixing portion configured to fix the support portion and the operation portion, wherein the fixing portion comprises a weight enabling adjustment of a load for pressing the foam body;
  at least one end portion of the outer circumferential surface bending toward a direction of the central axis, the film application method comprising:
  adhesively attaching a first portion of the film by using the roller;
  moving the roller to a position where the outer circumferential surface of the foam body is located at the first portion of the film, and a position where the outer circumferential surface of the foam body is located at an adjacent second portion of the film; and
  pressing the first portion of the film and the adjacent second portion of the film by the outer circumferential surface of the foam body.

12. The film application method according to claim 11, wherein a load for pressing the roller is set to a range of greater than 0.4 N/cm and less than 1.8 N/cm.

13. A film application method of adhesively attaching a film to a target object comprising a recess portion or a protruding portion by using a roller and a local pressing tool for pressing a root portion of the recess portion or the protruding portion,
  the roller comprising:
  a core portion having a cylindrical shape;
  a support portion located on a central axis of the core portion and configured to rotatably support the core portion;
  a foam body covering an entire circumference of the core portion and comprising an outer circumferential surface being flat;
  an operation portion configured to operate the foam body; and
  a fixing portion configured to fix the support portion and the operation portion, wherein the fixing portion comprises a weight enabling adjustment of a load for pressing the foam body
  at least one end portion of the outer circumferential surface bending toward a direction of the central axis, the film application method comprising:
  adhesively attaching the film to the target object except for the root portion by using the roller; and
adhesively attaching the film to the root portion by using the local pressing tool.

* * * * *